United States Patent [19]
Hubby, Jr.

[11] Patent Number: 4,873,398
[45] Date of Patent: Oct. 10, 1989

[54] FLAT PANEL DISPLAY WITH INTEGRATED DIGITIZING TABLET

[75] Inventor: Laurence M. Hubby, Jr., Palo Alto, Calif.

[73] Assignee: Hewlett-Packard Company, Palo Alto, Calif.

[21] Appl. No.: 213,756

[22] Filed: Jun. 30, 1988

[51] Int. Cl.⁴ .................. G08C 21/00; G03B 21/14
[52] U.S. Cl. .................................. 178/18; 350/117; 340/705; 340/706; 340/784
[58] Field of Search .............. 178/18, 19; 350/117, 350/121, 122; 340/705, 706, 784

[56] References Cited

U.S. PATENT DOCUMENTS 4,679,909  7/1987  Hamada et al. .
4,760,389  7/1988  Aoki et al. ............. 340/784

OTHER PUBLICATIONS

Scriptel SPD-Series Technical Report No. SPD-TR2, May 1985.
Photron Integrated Display Digitizer FIOS-6440 (data sheet).
Sony Transparent Tablet TNN-01 (data sheet).
A View Pad—Japanese Data Sheet.
"Handwriting Recognition on Transparent Tablet Over Flat Display", by Tappert et al., in *SID 86 Digest*, Article 17.3.
"Photolytic Technique for Producing Microlenses in Photosensitive Glass", by Borrelli et al., in *Applied Optics*, vol. 24, No. 16, Aug. 15, 1985.
"Close-up Imaging of Documents and Displays with Lens Arrays", by R. H. Anderson, in *Applied Optics*, vol. 18, No. 4, Feb. 15, 1979.

*Primary Examiner*—Stafford D. Schreyer
*Attorney, Agent, or Firm*—William H. F. Howard

[57] ABSTRACT

A novel flat panel display is provided which allows for very precise and reliable detection of the location of the cursor with respect to the displayed image. Parallax problems are eliminated by focusing the displayed image on a panel by projecting the image through the panel. The location of the stylus is accurately determined, in one embodiment, utilizing prior art digitizing techniques together with the use of an erect, unity magnification imaging lens array for displaying the projected image. In another embodiment of this invention, accurate determination of the location of the stylus with respect to the displayed image is provided by causing the stylus to feed signals, for example optical signals, through a significant portion of the optical path used for displaying the image.

14 Claims, 2 Drawing Sheets

FLAT PANEL DISPLAY WITH INTEGRATED DIGITIZING TABLET

BACKGROUND

This invention pertains to a digitizing tablet integrally formed with a flat panel or other type of rear projection display, and more specifically with a fast-update, durable digitizing tablet having excellent spatial linearity and stability, and which integrates well with a projection display.

Transparent digitizing tablets are often intended for use with some sort of display system in order to provide the user with the appearance of writing on top of the displayed image. This may be done, for example, to facilitate outline tracing of some structure in a projected photographic image, to allow an input mode which emulates natural writing. In all of these applications, correspondence between the coordinate system of the transparent tablet and that of the display system is a desired, if not crucial, characteristic.

Prior art transparent digitizing tablets, such as the SPD series of devices manufactured by Scriptel Corporation of Columbus, Ohio, utilize magnetic, electrostatic, or acoustic techniques to specify the location of the stylus. Use of such a prior art transparent digitizing tablet as a combination display/digitizer, such as the FIOS-6440 device manufactured by Photron Ltd. of Tokyo, Japan, or the use of a transparent digitizing tablet such as the TNN-01 from Sony Corporation in conjunction with a CRT, can result in poor correspondence between the detected location of the stylus and the desired portion of the displayed image.

FIG. 1 shows a cross section of a typical prior art transparent digitizer tablet system including a digitizing tablet 11 located adjacent to liquid crystal display 12. Prior art system 10 includes a surface plate 13 (which may help to contain liquid crystal display 12) located above liquid crystal display 12 and upon which stylus 14 is placed, thus leading to problems with parallax, since the image is formed on liquid crystal display 12 located below the surface of surface plate 13. Regardless of the technique used to specify the location of the cursor with respect to the displayed image, the tablet must be aligned with respect to the image produced by the display, and may not, even when optimally aligned, provide coordinates which register well with those of the displayed image due to distortions in either or both the tablet or the image produced by the display. The additional difficulties due to parallax are described, for example, in "Handwriting Recognition on Transparent Tablet over Flat Display", Tappert et al., SID 86 Digest, pages 308-312. Additionally, such environmental effects as stray electric or magnetic fields and triboelectric charging can cause distortions and/or disruptions in the digitized stylus position data. Certain prior art devices, such as the "Summasketch" device available from Summa Graphics, the "Screenplay" device from Seiko, and the HDG 1111C device from Hitachi are electromagnetic tablets which require a sensing element in the stylus whose equivalent location does not correspond well to the physical location of the stylus tip, resulting in distortions in the reported coordinates which may vary with the position of the stylus or the angle at which it is held.

Thus, there remains the problem with prior art transparent digitizer tablets relating to correspondence between the intended location of the stylus and the corresponding point of the displayed image.

SUMMARY

In accordance with the teachings of this invention, a novel flat panel display is provided which allows for very precise and reliable detection of the location of the cursor with respect to the displayed image. In accordance with one embodiment of this invention, parallax problems are eliminated by focusing the displayed image on a panel by projecting the image through the panel, for example using projection image techniques, or an erect, unity magnification imaging lens array. In one embodiment, the location of the stylus is accurately determined utilizing prior art digitizing techniques together with the use of an erect, unity magnification imaging lens array for displaying the projected image. In another embodiment of this invention, accurate determination of the location of the stylus with respect to the displayed image is provided by causing the stylus to feed signals, for example optical signals, through a significant portion of the optical path used for displaying the image.

DETAILED DESCRIPTION

In order to provide a computer interface device which allows the user to enter data and commands by writing with a stylus directly on a display as he would with a pen or pencil on paper, a rear projection display is, in accordance with the teachings of this invention, combined with either a transparent digitizing tablet or an optical tablet. The projection display focuses its image on the writing surface, thus eliminating paralax between the point at which the stylus touches the screen and the point at which a corresponding pixel in the displayed image is located. Because the projection path can be folded with mirrors, the screen/writing surface can be positioned for comfortable writing or drawing (unlike such display devices as a CRT). Detection of the position of the stylus is accomplished, for example, by prior art tablet technologies suitable for use with a transparent work surface or a work surface partially comprising the frosted surface of the screen, or by the unique optical tablet system taught as one feature of this invention and described more fully below. The latter is preferred, as it provides greatly improved linearity and stability of the correspondence between the displayed image and the reported stylus coordinates, increased update rate (i.e. the number of coordinate pairs which are transmitted to a computer per unit of time), and improved insensitivity to the angle at which the stylus is held while writing.

Figure 1:
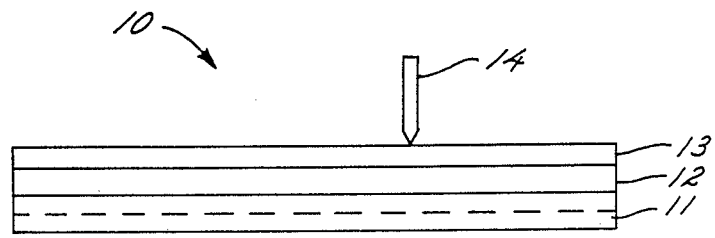
FIG. 1 is a cross-sectional view of a typical prior art transparent digitizing tablet.
Figure 2:
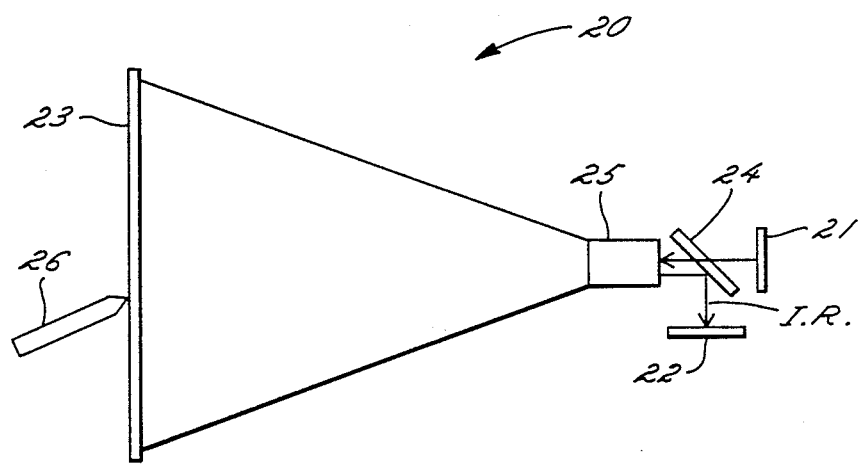
FIG. 2 is a diagram of a projection display device including means for determining the position of a stylus on the display screen which is constructed in accordance with one embodiment of this invention.

One embodiment of an optical tablet system constructed in accordance with the teachings of this invention is illustrated in FIG. 2. As shown in FIG. 2, optical tablet system 20 includes image projection device 21, for example a typical prior art projection television device, or the like. Preferably, image projection device 21 comprises the projection device described in copending U.S. patent application Ser. No. 07/184,459, filed Apr. 21, 1988 on an invention of Baldwin entitled "Three-color Separation Using Subtractive Dichroic Beamsplitters". Image projection device 21 provides an image, for example a full color image, for display on screen 23. Light from projection device 21 is passed through beamsplitter 24 to lens 25, which in turn focuses the projected image onto screen 23. Optical tablet system 20 also includes image sensor 22, for example a video camera, vidicon tube, or a charge couple device (CCD) semiconductor element. Image sensor 22 serves to detect a signal emitted from stylus 26, and is configured so as to be able to not only detect the presence of the signal from stylus 26, but also the location of stylus 26 on screen 23. The signal from stylus 26 is typically a light signal, and is focused on image device 22 by a lens which may conveniently be lens 25 as shown in FIG. 2, although an additional lens (not shown) could be used for this purpose.

The signal emitted by stylus 26 must be separable from the light from projection device 21 in order to avoid "feedback" from the displayed image to image device 22. This is accomplished, for example, by having stylus 26 emit infrared radiation and removing the same band of infrared radiation from the output of projection device 21, and simultaneously causing image sensor 22 to be sensitive only to that band of energy emitted by stylus 26. In this embodiment of the invention, this is accomplished by using an image device which is sensitive only to infrared radiation and not to visible light, or by using an imaging device which is sensitive to infrared energy, while filtering energy directed to the image device to prevent any visible light from reaching image sensor 22.

In one embodiment, infrared and visible light are separated using a beamsplitter 24 as shown in FIG. 2, such as a dichroic beamsplitter. In another embodiment, light from projection device 21 is polarized in a first direction, and light emitted from stylus 26 is polarized in a different direction, such as orthogonally, and one or more polarizing beamsplitters are used to separate the light from projection device 21 and the light from stylus 26. In other embodiments, light from projection device 21 is distinguished from the signal emanating from stylus 26 based on wavelength, intensity, or modulation.

It is also desirable, as mentioned before, to have good linearity and stability between display pixel locations and reported stylus coordinates. In accordance with the teachings of this invention, this is accomplished in a direct fashion with the optical tablet, with both the projection image source and the tablet image sensor being made geometrically precise and mechanically stable, and with both viewing the screen through the same optical system. Geometrical precision and mechanical stability can be provided if, for example, projection device 21 includes a matrix-addressed liquid crystal panel (such as are available from Seiko-Epson of Suwa, Japan) used as a light valve, and the optical tablet sensor is an area CCD array such as that commonly used in consumer video cameras. In this case, both projection device 21 and image detector 22 have lithographically defined geometry which is as stable as their respective substrates.

Preferably, a thin-film transistor (TFT) active matrix liquid crystal display (LCD) panel is used as a light valve in order to obtain better contrast and the ability to turn pixels on and off linearly while providing small pixel size and a fast update rate. Relative alignment of projection device 21 and image detector 22 is limited only by the minor extent to which the optical system treats light from projection device 21 and light from stylus 26 differently. Lateral chromatic aberration in projection lens 25 limits the precision of the alignment, for example, in the case that the two are separated by wavelength difference, and maintained to the limit of the precision in the mechanical mounting of projection device 21 and image detector 22. It is a further advantage of this embodiment that no adjustment of image detector 22 relative to projection device 21 is necessary when the entire unit is moved relative to screen 23.

Figure 3:
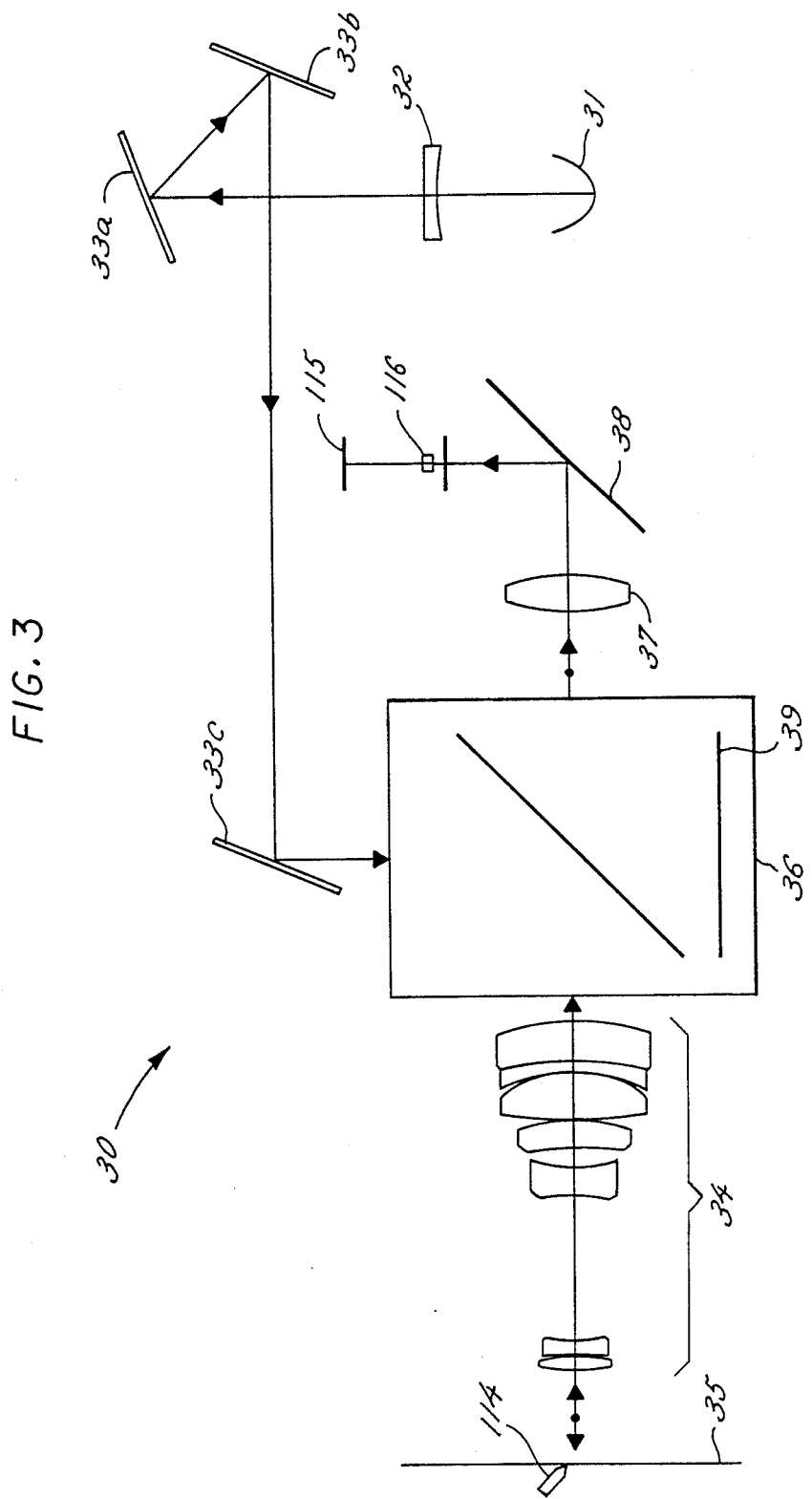
FIG. 3 is a diagram depicting in more detail one embodiment of optics suitable for use in the structure of FIG. 2.

The teachings of this invention are suitable for use with a wide variety of projection devices (i.e., monochrome or color, for example) and image device types and sizes. For example, a single-lens color projector using matrix-addressed red, green, and blue liquid crystal light valve panels and an image sensor of a smaller size than the light valves is shown in the diagram of FIG. 3. As shown in FIG. 3, lamp 31 provides a source of white visible light which is directed toward expanding lens 32 in order to provide a beam of suitable size, and is reflected by mirrors 33a, 33b, and 33c to beamsplitter device 26. If desired, one or more of mirrors 33a, 33b, and 33c also serve to reject, for example by absorption, infrared energy which might be emitted from lamp 31, thereby preventing such infrared light from becoming noise with respect to the infrared light emitted from stylus 114. If desired, in addition to or in place of using one or more of mirrors 33a, 33b, and 33c to reject infrared energy, an infrared filter can be placed in the optical path between lamp 31 and beamsplitter device 36. Naturally, if the signal emitted from stylus 114 is other than infrared energy, for example ultraviolet, or distinguishable from the image projected on screen 35 in another manner, for example by modulation or polarization, similar techniques can be used to filter out emissions from lamp 31 which might otherwise be confused with the signal emitted from stylus 114.

Beamsplitter device 36 serves broadly to reflect visible light received from mirror 33c to projection lens 34 and thence to screen 35. Beamsplitter device 36 also serves to transmit infrared light and/or other radiation emitted by stylus 114, through screen 35 and projection lens 34 to infrared lens 37. The infrared light is focused by lens 37, reflected by mirror 38 to image reducing lens 116, and thence to image sensor 115. In this manner, beamsplitter 36 transmits unwanted infrared radiation from lamp 31 to absorbing surface 39, preventing transmission of such radiation to screen 35 which might be misinterpreted as radiation emitted from stylus 114. At the same time, visible light reflected from screen 35 is reflected by beamsplitter device 36 back toward lamp 31, thereby preventing interference with the operation of infrared sensor 115.

Beamsplitter device 36 can take any one of a number of forms, and may comprise one of the embodiments disclosed in the aforementioned copending U.S. patent application Ser. No. 07/184,459, filed Apr. 21, 1988 on an invention of Baldwin entitled "Color Separation Using Subtractive Dichroic Beamsplitters". In this event, an additional beamsplitter is used for separation of visible light from infrared (or other energy transmitted by stylus 114). Alternatively, a turning mirror used in the embodiments disclosed in the aforementioned copending U.S. patent application can be replaced with a beamsplitter which serves as a turning mirror for reflecting visible light, yet which transmits the energy emitted from stylus 114. As will be appreciated by those of ordinary skill in the art in light of the teachings of this invention, many variations of beamsplitter 36 can be used advantageously.

Variations on the geometry shown in the Baldwin structure will also become apparent to those of ordinary skill in the art in light of the teachings of this invention, such as permuting the order of the red, green, and blue panels or changing the direction in which the input light arrives and/or the direction in which the output light leaves the central group of beamsplitters and image panels, with corresponding changes in the nature of the dichroic beamsplitters involved.

Advantages of this invention over prior art methods and structures for interfacing a displayed image with a means for detecting the placement of a stylus on the image screen are that parallax is substantially eliminated, while simultaneously providing a structure which allows the operator to utilize the stylus as a writing instrument in a very comfortable, natural manner.

As described above, in accordance with the teachings of this invention, an imaging device is used to logically locate the stylus. To accomplish this, the stylus must be made to either emit or absorb light, and the light associated with the stylus location must be made separable from that associated with the displayed image. In one embodiment of this invention, an infrared emitting slylus is used with a visible-light-only display. Another embodiment utilizes a passive stylus which absorbs ultraviolet radiation strongly, used together with a visible-light-only display and an overall flood lighting of the underside of the writing surface with ultraviolet light, with image sensor 40 detecting the absence of ultraviolet light where the stylus is located. Yet another embodiment utilizes a passive stylus which absorbs ultraviolet, as above, and fluoresces (for example, by utilizing a dye which as Rhodomine GG dye) in a narrow band of visible wavelengths used with a display whose light has been pre-conditioned by selectively removing the same band of wavelengths. In all of these embodiments, the image sensor is sensitive to light of the wavelengths corresponding to those associated with the stylus.

The image sensor is preferably an area device such as a videcon tube or an area CCD array, as opposed to a pair of linear optical arrays. The use of area CCD arrays make the optics much simpler and delivers higher density light signals to the desired pixels in the array. The position of the stylus is then determined by locating the signal characteristic of the stylus within the waveform produced by the image sensor as its area is systematically scanned, and comparing the time at which the stylus signal occurs relative to the start of scan to the known scanning pattern of the image sensor.

In an alternative embodiment, light from the stylus is split into two parts, each part being shaped with appropriate anamorphic optics to produce from a single pixel two perpendicular line images, each of whose locations vary in relation to the stylus position in only one direction (x or y); the x and y coordinates are then separately sensed with two linear CCD arrays. The previously-mentioned area sensor is to be preferred because of greater simplicity in the optics, and because additional information about the stylus (such as its size and shape) can be derived by sensing a full two-dimensional image.

In all of the above embodiments, it may be necessary or desirable to interpolate the position of the stylus to a resolution greater than that to which the image sensor quantizes its signal by virtue of its basic operation (the number of pixels into which a CCD array is lithographically divided, or the number of scan lines chosen for a videcon tube, etc.). This interpolation is readily performed by well-known techniques.

The image of the portion of the stylus which is in contact with the writing surface/screen is sensed in order to provide an indication of cursor position, offering the advantage of automatic compensation for, or insensitivity to, stylus tilt. Two factors assure that this is true. First, the image sensor views the writing surface/screen through a lens system which is in focus only at the surface at which contact is made. Secondly, the diffuse nature of the screen which is required for a wide-angle viewing of the projected image and the texturing of the writing surface which is desirable in order to provide a writing "feel" similar to that of pen or pencil on paper cause objects not in actual contact with the surface to be very poorly resolved via the well-known "velum effect". Preferably the screen surface is formed from a good diffuse scattering material which backscatters very little light, such as the TR-50 coating manufactured by Da-Lite Screen Company of Cincinnati, Ohio.

A wide variety of styli or stylus tips having any desired size or shape can be used in order to emit various patterns of radiation. For example, the stylus tip can be essentially a point source of radiation, as described by Baldwin in copending U.S. patent application Ser. No. 07/184,513, filed Apr. 21, 1988 on an invention entitled "Stylus Switch". Alternatively, the stylus tip can have the appearance of being an airbrush in that a relatively broad beam of light of any desired shape is emitted from the stylus. Also, an irregular shaped stylus such as a brush consisting of optical fibers (each of which emits light from its tip) can be provided, its shape and size at any given time, as well as position, sensed and reported, and the display inked in a corresponding pattern.

A significant advantage of the present invention is that the optical system used to project signals from the stylus to the image sensor can be largely or wholly shared with the optical system used to project the image on the screen. This is highly beneficial, not only because of the resulting economy, but also because such shared optical paths cause distortions introduced by the optics to be common to both the image sensor and display. This causes the coordinates systems of the image sensor and display to correspond quite closely, and allows the device to be refocused (for example, to accommodate a replacement screen which may not be exactly the same size, thickness, etc. as the previous one) without requiring relative realignment of the image sensor and display. The items which must be held in critical alignment with respect to each other are thus beneficially reduced to a small volume.

Figure 4:
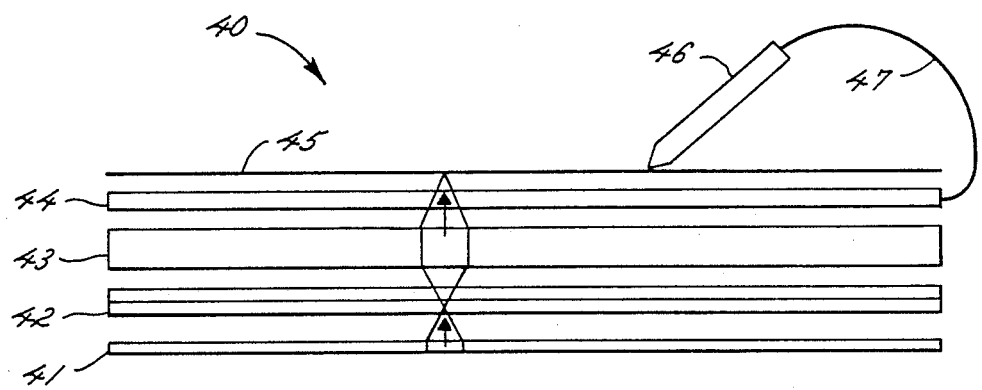
FIG. 4 is a cross-sectional view of one embodiment of a flat panel projection device which is constructed in accordance with the teachings of this invention, and which includes means for determining the position of a stylus.

FIG. 4 is a cross-sectional view of an alternative embodiment of this invention. As shown in FIG. 4, apparatus 40 includes light source 41 for projecting light toward projection screen 45. Between light source 41 and projection screen 45 is located imaging panel 42, which can comprise, for example, a liquid crystal display including a number of pixels which can be independently switched on and off in order to modulate the light emanating from light source 41, with the modulated light projecting an image on projection screen 45. A thin lens 43 is placed between image device 42 and projection screen 45 in order to focus the modulated light from image device 42 onto projection screen 45. Any suitable thin lens device can be used as lens device 43, including but not limited to erect, unity magnification imaging lens arrays such as the SELFOC devices available from NSG America, Inc. of Somerset, N.J. Alternatively, MLA lenses available from Corning Glass Works, Corning N.Y., can be used as lens device 43. Alternatively, any type of array of lenses formed photolithographically as a thin sheet are suitable.

Also included in assembly 40 is digitizer means 44, which can consist, for example, of a prior art digitizer such as the Sony TNN-01 device as previously described. Projection screen 45 conveniently is formed of frosted glass or plastic, in order to provide both a sharp image and a moderately textured writing surface.

All publications and patent applications are herein incorporated by reference to the same extent as if each individual publication or patent application was specifically and individually indicated to be incorporated by reference. The invention now being fully described, it will be apparent to one of ordinary skill in the art that many changes and modifications can be made thereto without departing from the spirit or scope of the appended claims.

What is claimed is:

1. A flat panel display comprising:
   a screen;
   means for projecting an image; and
   a substantially thin lens for focusing said image on said screen.

2. A flat panel display as in claim 1 wherein said lens comprises an erect unity magnification imaging lens array.

3. A flat panel display as in claim 1 further comprising means for determining the position of a stylus when said stylus is placed adjacent to said screen.

4. A flat panel display as in claim 3 wherein said means for determining comprises a digitizer.

5. A flat panel display as in claim 4 wherein said digitizer is either an electrostatic or an electromagnetic digitizer.

6. A flat panel display as in claim 3 wherein said means for determining comprises an imaging device which receives a position signal from said stylus.

7. A flat panel display as in claim 6 wherein said position signal is transmitted to said imaging device through said erect unity magnification imaging lens array.

8. A display comprising:
   a screen;
   means for projecting an image;
   means for focusing said image on said screen;
   means for determining the position of a stylus when said stylus emits a position signal when placed adjacent to said screen, said means for determining comprising an image device for receiving said position signal.

9. A display as in claim 8 wherein said image device receives said position signal through said means for focusing.

10. A display as in claim 7 or 9 wherein said position signal is distinguishable from said image by wavelength, modulation, or polarization.

11. A display as in claim 10 further comprising means for separating said position signal from said image.

12. A display as in claim 11 wherein said means for separating comprises a beamsplitter.

13. An interactive computer terminal comprising:
    a translucent work surface having a front and back;
    means for projecting an image from the back of the work surface to the front of the work surface so as to focus the image on the front of the work surface;
    indicator means producing a signal for use on the front of the work surface by an operator; and
    means for receiving the signal produced by the indicator means.

14. An interactive computer terminal for outputting information to an operator and inputting information from the operator, comprising:
    a translucent work surface having a front and back;
    means for projecting an image, containing the information to be outputted, from the back of the work surface to the front of the work surface so as to focus the image on the front of the work surface to be viewed by the operator;
    indicator means producing a signal for use on the front of the work surface by an operator so as to indicate information to be inputted; and
    means for receiving the signal produced by the indicator means so as to produce the information to be inputted.

* * * * *